US009819801B2

(12) United States Patent
Koum et al.

(10) Patent No.: US 9,819,801 B2
(45) Date of Patent: *Nov. 14, 2017

(54) VOICE COMMUNICATIONS WITH REAL-TIME STATUS NOTIFICATIONS

(71) Applicant: WhatsApp Inc., Mountain View, CA (US)

(72) Inventors: Jan Koum, Redwood City, CA (US); Michael B Donohue, Mountain View, CA (US); Brian Acton, Santa Clara, CA (US); Erik James Reed, Dublin, CA (US); Dima Stukalov, Santa Clara, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,055

(22) Filed: Feb. 8, 2017

(65) Prior Publication Data

US 2017/0149978 A1    May 25, 2017

Related U.S. Application Data

(63) Continuation of application No. 14/949,057, filed on Nov. 23, 2015, now Pat. No. 9,602,985, which is a continuation of application No. 13/958,408, filed on Aug. 2, 2013, now Pat. No. 9,226,121.

(51) Int. Cl.
*H04M 1/725* (2006.01)
*H04M 3/537* (2006.01)
*H04W 4/12* (2009.01)
*H04L 12/58* (2006.01)
(Continued)

(52) U.S. Cl.
CPC .......... *H04M 3/537* (2013.01); *H04L 51/043* (2013.01); *H04L 51/10* (2013.01); *H04M 1/7255* (2013.01); *H04M 3/42382* (2013.01); *H04M 7/0045* (2013.01); *H04M 7/0051* (2013.01); *H04W 4/12* (2013.01); *H04M 2201/38* (2013.01); *H04M 2201/42* (2013.01); *H04M 2203/2083* (2013.01)

(58) Field of Classification Search
CPC ............... H04W 4/12; H04M 1/72547; H04M 1/72552; H04M 3/487; H04M 3/537; H04L 12/587; H04L 12/5895
USPC .............................. 455/412.2, 466, 566, 567
See application file for complete search history.

(56) References Cited

U.S. PATENT DOCUMENTS

| 8,204,486 B2 * | 6/2012 | Brock ............... H04M 3/53333 379/88.11 |
| 2010/0166159 A1 * | 7/2010 | Katis ................... H04L 12/1822 379/88.13 |

* cited by examiner

*Primary Examiner* — Temica M Beamer

(57) ABSTRACT

A system, apparatus, graphical user interface and methods are provided for conducting electronic voice communications with status notifications. A user of a first portable device executing a communication application selects a multi-function control that automatically initiates an audio recording, which is automatically sent toward another participant of an active communication session when the control is released. The same multi-function control may be used to transmit a textual message. A representation of the recording is displayed on the user's device, with an indicator that changes appearance when the other participant plays the recording. In addition, when one user initiates an audio recording that will be automatically sent to another user, the other user's device is advised of the initiation of recording and displays that status for the other user.

17 Claims, 17 Drawing Sheets

(51) Int. Cl.
*H04M 3/42* (2006.01)
*H04M 7/00* (2006.01)

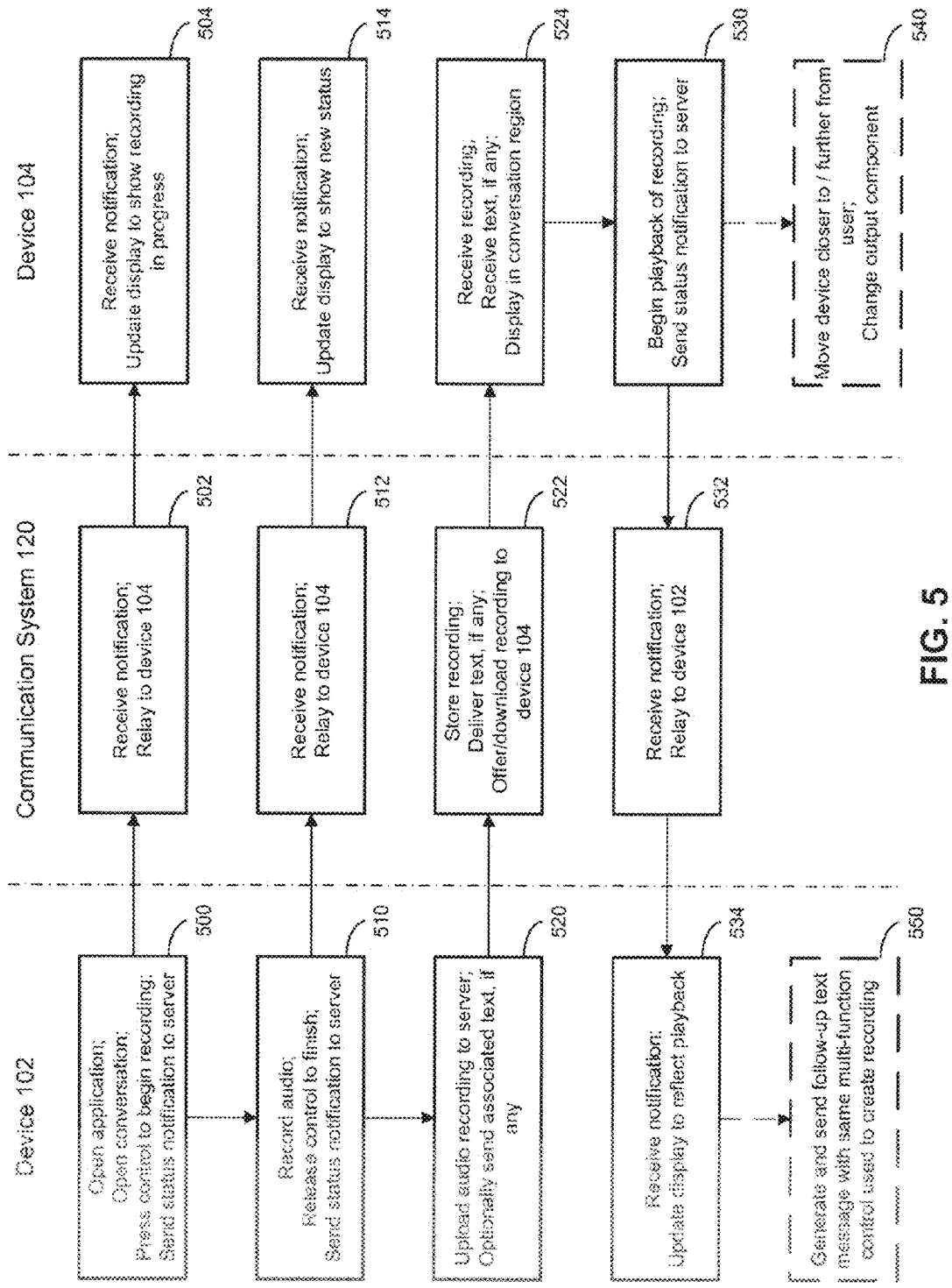

VOICE COMMUNICATIONS WITH REAL-TIME STATUS NOTIFICATIONS

CROSS-REFERENCE TO RELATED APPLICATION

This application is a continuation of and claims the benefit of priority to U.S. patent application Ser. No. 14/949,057, titled "Voice Communications with Real-Time Status Notifications," filed on Nov. 23, 2015, which is a continuation of and claims the benefit of priority to U.S. patent application Ser. No. 13/958,408, titled "Voice Communications with Real-Time Status Notifications," filed on Aug. 2, 2013, which are hereby incorporated by reference in their entireties.

BACKGROUND

This invention relates to the fields of computers and electronic communications. More particularly, a system, apparatus, graphical user interface and methods are provided for conducting electronic voice communications with status notifications.

Wireless telephones have become indispensable accessories and accompany most people wherever they go. Mobile telephone users are therefore almost always reachable via some form of communication. The ability to conduct live, real-time voice communications is still the main reason many people carry their phones, but many other people may use their telephones more for non-voice communications than for real-time voice communication.

In particular, many people use wireless telephones to exchange short text messages via SMS (Short Message Service). SMS messages are generally limited to 140 characters of text, and are conveyed via control channels of wireless telephone service providers' voice networks. Thus, whether a wireless telephone user is sending a text message to one person or to many people, he or she is limited in how much he or she can communicate at one time. MMS (Multimedia Messaging Service) was developed to allow media (e.g., images, video) to be conveyed to and from wireless telephones, but still relies on the SMS protocol to deliver a notification to the recipient.

A wireless telephone user's ability to exchange recorded voice communications with another wireless telephone user, however, are cumbersome, even with MMS. In particular, initiating a voice recording (or other audio recording) on a typical wireless telephone requires multiple actions, such as manipulation of multiple controls in the correct sequence. For example, a user may need to open a recording application, start a recording, end the recording, possibly name it for storage, open a communication application, create a message to the desired recipient, select an option to add an attachment, then find and attach the recording. Even if the originating and destination users are operating a common communication application, the originator may still need to open a menu to find and select an option to make a recording, start the recording, stop it, then select an option to send it to the recipient.

SUMMARY

In some embodiments of the invention, a system, apparatus, graphical user interface and methods are provided for conducting voice communications with real-time status notifications. In these embodiments, a user of one portable device is able to easily and quickly create and send an audio recording to a user of another device. Either or both users may receive real-time notifications of the status of the other user or of a recording.

In some embodiments, with a single manipulation of a multi-function control, a user of one portable electronic device creates and transmits an audio recording to another user. The same control, in a different context, allows the user to transmit a textual message separate from the audio recording. In some implementations, the control may change appearance depending on the context—such as whether or not the user has entered text into a text window or dialog box.

In some embodiments, the sender of an audio recording receives a real-time notification that the recipient has initiated and/or completed playback of the recording. In some implementations, a representation of the audio recording (e.g., in a graphically displayed version of the users' conversation) or of the other user changes appearance to indicate this change in status of the recording.

In some embodiments, the recipient of the audio recording may be advised that the sender has commenced an audio recording. For example, when recording begins, a signal may be issued toward the recipient's device and the recipient may see the status before the sender completes the recording.

DESCRIPTION OF THE FIGURES

FIG. 5 is a flow chart demonstrating a method of supporting voice communications with real-time status notifications, in accordance with some embodiments of the invention.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a system, apparatus, user interface and methods are provided for conducting voice communications with real-time status notifications. In different embodiments, one or more of multiple complementary features are implemented, such as one-touch voice recording, dynamic real-time notification to a communication partner of the commencement of a voice recording, reliable delivery of the recording to the partner, real-time notification of playback of the recording by the communication partner and automatic selection of a output device for playing an audio recording.

Embodiments of the invention are implemented within a communication environment in which text, images, voice recordings and/or other electronic information are exchanged via data communication channels conforming to an IEEE 802.11 standard (e.g., Wi-Fi® connections). In these embodiments, rather than relying upon traditional wireless voice communication channels that provide limited support for transmission of instant or real-time communications other than live voice conversations, the data communication channels allow unconstrained exchange of virtually all types of communications and media between devices of the same and/or different types.

Illustrative embodiments of the invention are described as they may be implemented as part of a one-on-one communication session (e.g., a chat session), but may also be applicable to group communication sessions (e.g., group chat).

Figure 1:
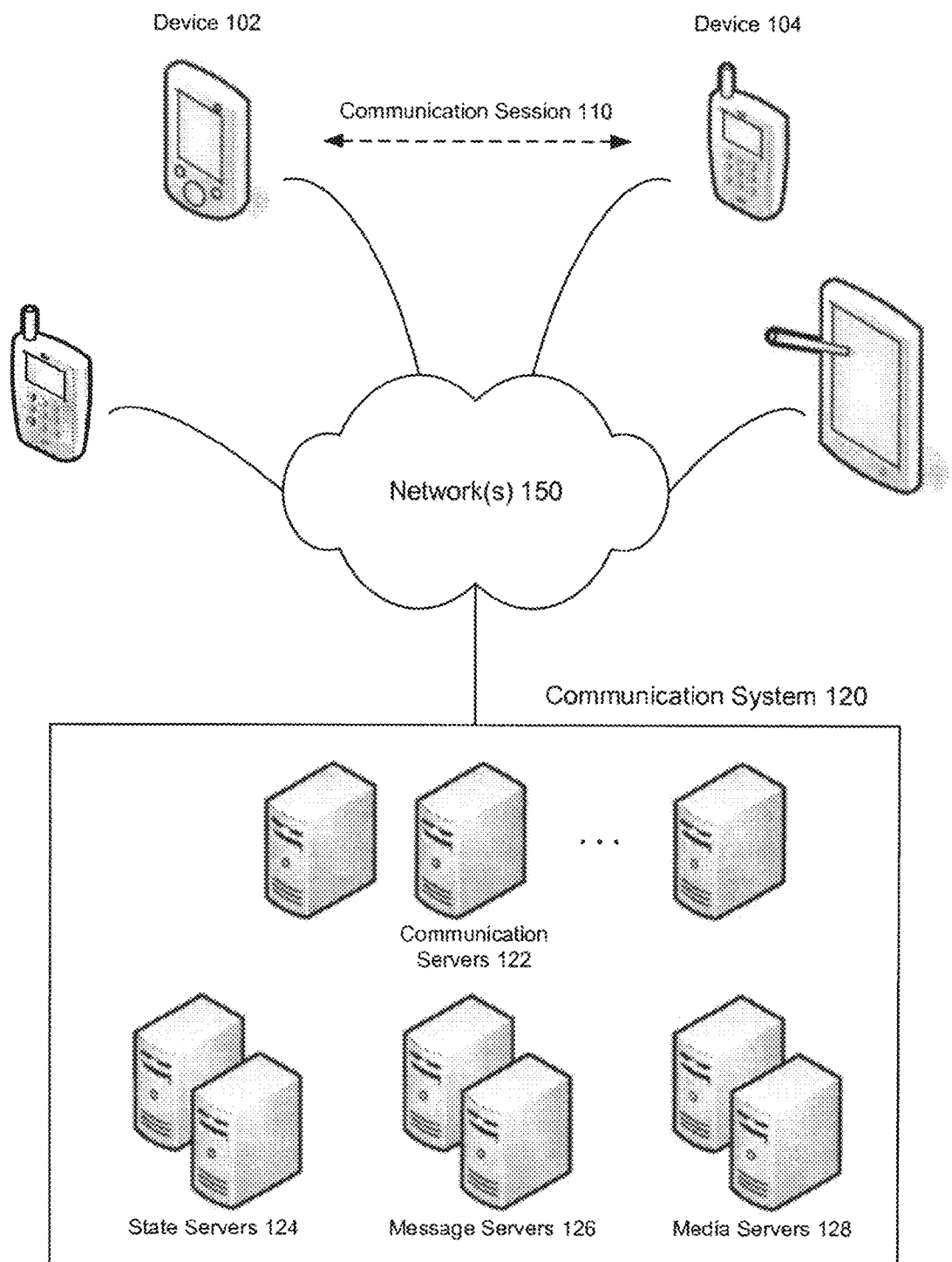
FIG. 1 is a block diagram of a system for facilitating recorded voice communications with real-time status notifications, in accordance with some embodiments of the invention.

FIG. 1 is a block diagram of a system for facilitating recorded voice communications with real-time status notifications, according to some embodiments of the invention.

In these embodiments, users of communication system 120 operate a variety of portable communication devices operating the same or different operating systems (e.g., Android, BlackBerry, iOS, Nokia S40, Symbian, Windows Phone). Thus, devices 102, 104 are operated by different users, but may be configured similarly or very differently. Communication session 110 between devices 102, 104 comprises separate connections between device 102 and system 120 and between device 104 and system 120.

System 120 is a data center, computer network or other cooperative collection of computer resources for hosting a communication application or service (or a server portion of a communication application) that can be simultaneously used by multiple users. In some implementations, the application provides a user with instant messaging of text, audio recordings, photos, video and multimedia from his or her communication device (e.g., device 102), to/from one or more other users operating other communication devices (e.g., device 104).

The communication application hosted by system 120 is compatible with devices 102, 104 and includes client logic that is executed under the devices' native operating systems. A user operating one type of device and subscribing to one communication server provider can exchange messages with users operating other types of devices and subscribing to other communication service providers. Individual messages may be sent to any number of recipients; for example, a group form of communication (e.g., chat) may be offered in which multiple users interactively exchange instant communications.

Communication servers 122 are front-end components of system 120 that host users' connections with the system and that facilitate the exchange of communications between users. Servers 122 may be referred to as "chat" servers, in that they receive real-time messages and chat session communications from individual users for delivery to one or more other users.

Illustratively, as long as a user is on-line with system 120 and the application is executing on his or her device, a connection or session may be maintained between the device and a communication server 122. When the user closes the application on the device, his or her connection may persist for some period of time (e.g., five minutes, fifteen minutes).

State servers 124 maintain states or statuses of users and/or users' devices. Thus, a state server stores some or all of a user's profile, including applicable preferences (e.g., preferred audible and/or visual alert, status message), device type/model, etc. Some status information maintained by a state server with regard to a user may persist only for the duration of the user's connection with system 120. As the user's device operates in different ways or different modes, goes offline, comes online and so on, a state server may capture those changes.

In some embodiments of the invention, however, statuses of users' devices or system connections are not retained. In these embodiments, however, a change in status of a user or user device may be reported to the system by the device, and relayed to other users who are engaged in communication (e.g., chat) sessions with that user, and/or to users who do not have open communication sessions with the user but who have subscribed to status updates regarding the user.

In these embodiments, as part of a user profile retained on a state server, identities of other users associated with that user may be identified. These other users will be informed of some or all changes in the user's status (or the changes in the status of the user's device)—such as when she comes online and when she goes offline. As described below, other status changes may also be communicated to the associated users.

Message servers 126 store communications that cannot immediately be delivered to their target or destination users. A new message (e.g., a textual chat message) received for a user who is currently on-line with system 120 can be delivered immediately (i.e., through the user's open connection with a communication server 122). However, a message received for a user who is currently off-line (i.e., does not have an open connection with a communication server 122) may be stored on a message server 126 until it can be delivered.

Media servers 128 store media files or content that await delivery to a destination user, other than messages that may be stored on message servers 126. For example, a message from one user to another may be or may comprise a photo, a video, an audio recording or some other media. The media is stored on a media server 128 until it can be delivered, which may be done automatically when the destination user is online, or which may be initiated only when the destination user requests the media (e.g., by clicking on a link in a textual message delivered to the destination user to advise him of the media content).

Information identifying termination points of online users' connections with system 120 may be stored on communication/chat servers 122, state servers 124 and/or other entities (e.g., a session server (not depicted in FIG. 1)). For example, each communication server may maintain a table or other data structure identifying users whose connections with the system are terminated at or hosted by that server. Another entity (e.g., a state server 124, a session server) may store a larger dataset that identifies, for every user connected to the system, which communication server maintains their connection.

Thus, when a communication server receives a new communication from a connected user, for one or more other users, it may perform a lookup within local data and/or data stored on another system entity in order to determine the other users' statuses (e.g., whether they are connected, whether they are busy communicating) and, if so, where. In some implementations, it will first search a local data table (e.g., a routing table), and only issue a query to another component if some or all destination users' statuses are not found locally.

Any number (e.g., one or more) of communication servers, state servers, message servers, media servers and/or other servers may be deployed within system 100. The functions of servers 122, 124, 126, 128 may be distributed differently in other embodiments, such as by being merged into fewer servers or divided among additional servers.

The servers of system 120 may be separate physical computer systems comprising hardware resources (e.g., processor, storage, communication interface) and software resources (e.g., program code, data) suitable for performing the functions ascribed to them. In some alternative embodiments, any or all of the servers may be virtual computing machines that share hardware and/or software resources. Thus, multiple software server modules performing different functions may reside on one server computer.

Network(s) 150 comprise communication paths between devices 102, 104 and system 120, and may include data and/or voice communication channels. For carrying data communications, networks 150 may comprise the Internet, one or more intranets, LANs (Local Area Networks), WANs (Wide Area Networks) and/or other point-to-point or distributed connections, which may be wired and/or wireless in nature. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO) and so on.

Networks 150 may thus comprise various entities not shown in FIG. 1, such as routers, gateways, switches, base stations (e.g., wireless access points, Node Bs, Evolved Node Bs) and/or other equipment for establishing, maintaining, switching or otherwise manipulating a data and/or voice connection.

Figure 2:
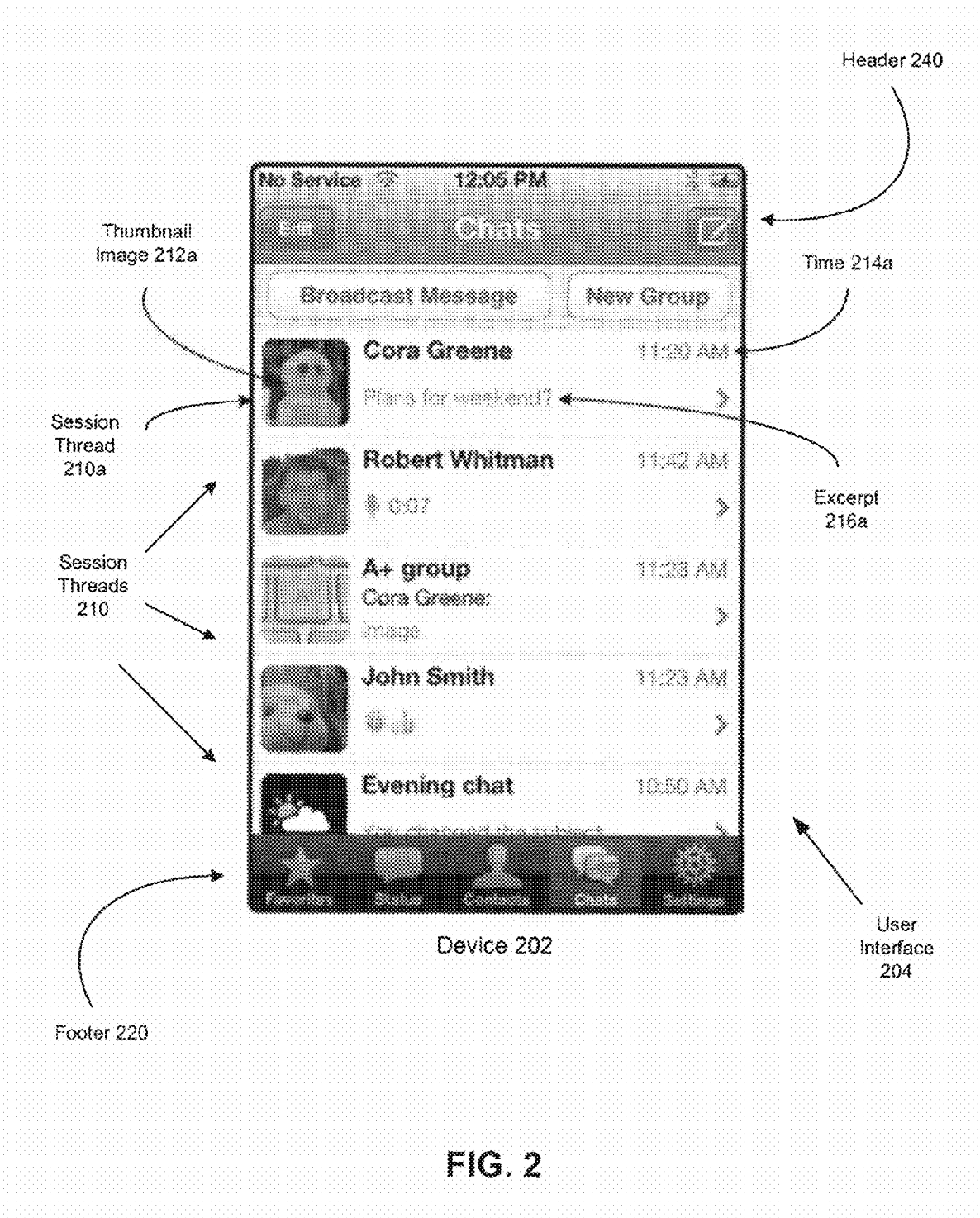
FIG. 2 illustrates a user interface of a device for conducting voice communications with real-time status notifications, in accordance with some embodiments of the invention.

FIG. 2 illustrates a user interface of a device for conducting voice communications with real-time status notifications, according to some embodiments of the invention. In these embodiments, device 202 may be a smart phone or a portable computing device on which a communication application hosted by system 120 of FIG. 1 has been installed. Therefore, an operator of device 202 is able to exchange communications in real-time with other users of the application. Their communications may comprise text, images, audio recordings and/or other media. Device 202 includes a touch-screen display, one or more microphones and one or more speakers, and may include other components not referenced herein.

In FIG. 2, a user or operator of device 202 has opened the communication application and is presented with user interface 204, including session threads 210. Each session thread 210 pertains to a separate communication session with one or more users. Some or all threads may include thumbnail images associated with another user involved in the session, if that user has provided an image, such as thumbnail image 212a of thread 210a. A thread may also identify the time or date of the last communication exchanged with that user (e.g., time 214a of thread 210a), and an excerpt of the last communication (if that communication included textual content) or the full communication if it was short enough (e.g., excerpt 216a of thread 210a.

A session thread will be listed for any active communication session the user of device 202 is participating in, and also for any session that the user has participated in within some period of time that has passed (e.g., one week, one month, three months, one year), which may or may not be configurable by the user. The user may need to scroll through the threads if they cannot all be displayed at once on the display component of device 202. Threads 210 may be sorted such that the thread associated with the most recently active communication session is at top, such that the most active session (e.g., the session with the greatest number of messages overall or greatest average communication rate) is at top, such that people selected by the user are listed first, or may be sorted in some other way.

Individual sessions among session threads 210 may be identified by the name of the other user participating in the communication session (for one-on-one sessions), or by the name of a group for group communication sessions. A thread for a group session may also identify the member who submitted the most recent communication, may identify which members of the group are currently online and/or provide other information.

Besides session threads 210, interface 204 of FIG. 2 includes footer 220 and header 240, either or both of which may provide soft controls for performing various functions. Illustrative functions include search (e.g., to locate a thread associated with a particular user or group), contacts (e.g., to add a contact, to start a conversation/communication thread with a contact), settings (e.g., to adjust an operating parameter of the communication application or the device, to modify an appearance of the user interface), status (e.g., to set a status to be displayed for communication partners and/or other users), creation of a new group, etc.

Hard controls of device 202 and other soft controls not depicted or labeled in FIG. 2 may have other functions and may depend on the type of device, the device's manufacturer, the device's operating system and/or other factors. These other functions are not listed here, so as not to obscure descriptions of features relevant to the invention.

FIGS. 3A-H demonstrate use of a graphical user interface for conducting voice communications with real-time status notifications, according to some embodiments of the invention.

Figure 3A:
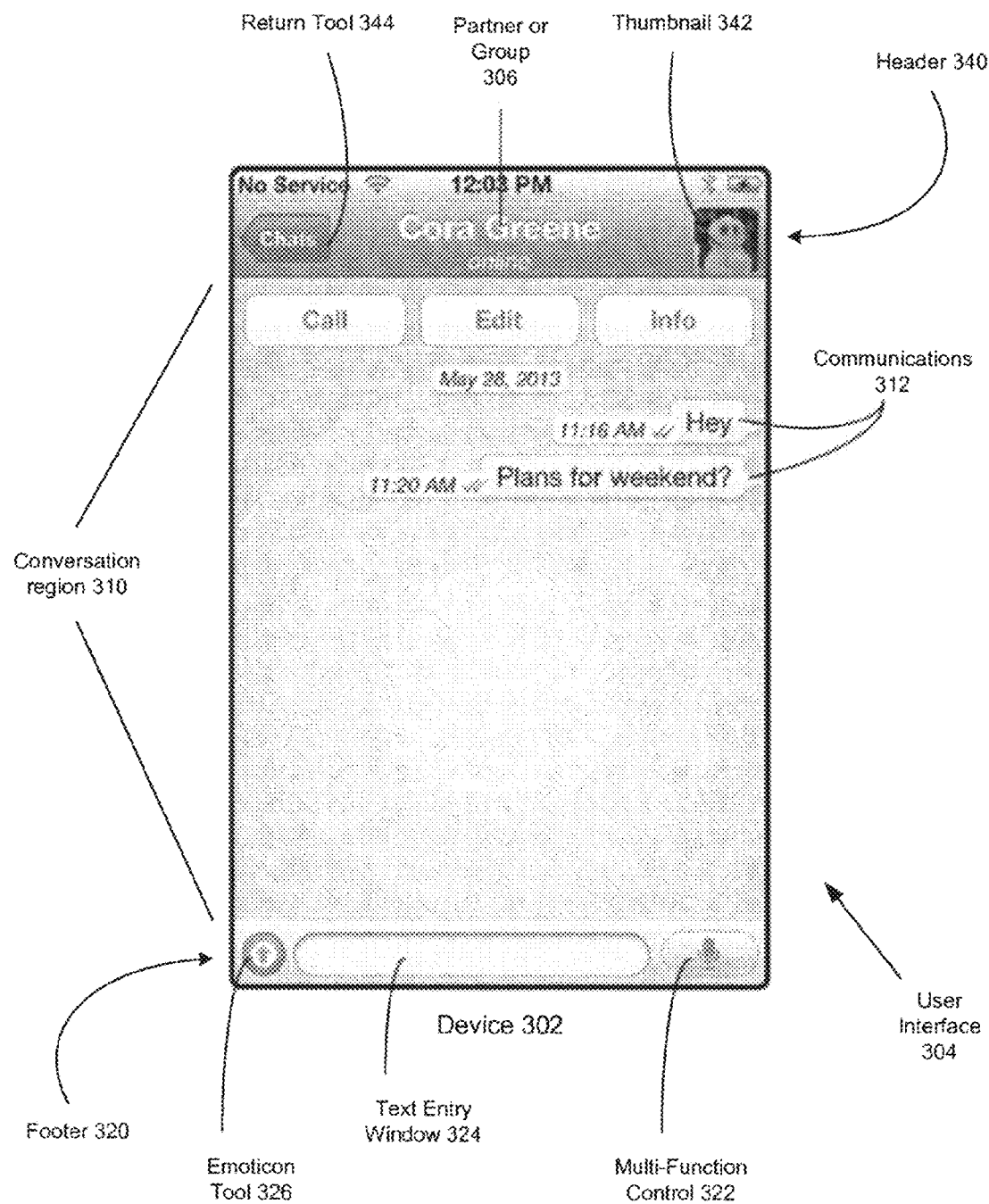
FIGS. 3A-H illustrate a graphical user interface for conducting voice communications with real-time status notifications, in accordance with some embodiments of the invention.

In FIG. 3A, graphical user interface (GUI) 304 is displayed on the touch-screen display of device 302 when the user selects a session thread 210 (e.g., thread 210a) from interface 204 of FIG. 2. User interfaces 204, 304 may be different portions of the same interface.

Interface 304 features conversation region or area 310, which displays recent communications 312 sent as part of the current communication session. In particular, if the users previously exchanged any communications during this session or thread, those conversations (or at least the most recent one(s)) will be displayed or represented in conversation region 310. Entire textual messages may be displayed (or just initial portions of long messages), and representations of audio recordings, images, videos and/or other communications that have been sent or received may also be displayed, as shown in subsequent figures. If the users have not conversed before (or within some period of time), or if this is a newly created conversation, region 310 may be devoid of communications.

GUI 304 of FIG. 3A features footer 320 that, in the illustrated embodiment, includes multi-function control 322, text entry window 324 and emoticon tool 326. Emoticon tool 326 may be activated to obtain a palette of emoticons for selection and entry into a text message. Text entry window 324 may be activated by the user to initiate or resume entering a textual message.

Multi-function control 322 of GUI 304 operates in different manners, depending on the context in which it is presented and as further discussed below. In one context, such as when the user opens the current communication session as shown in FIG. 3A, control 322 is displayed with one aspect or form—a microphone that can be selected (e.g., pressed, clicked).

In this context, the user can easily generate and send a voice or audio recording to the other user(s) participating in the session. Specifically, by pressing and holding control 322, a microphone in device 302 is activated and begins recording. Releasing the control afterward causes the recording to be automatically transmitted toward the other participant(s) in the conversation. In particular, the recording is transmitted to the system hosting the application (e.g., system 120 of FIG. 1), and subsequently delivered to the recipient(s). In another context, and as discussed below, multi-function control 322 enables transmission of a textual message.

Interface 304 of FIG. 3A also includes header 340 that offers thumbnail image 342 of or associated with the other user participating in the communication session, if it is a one-on-one session, and return tool 344 for returning to interface 204 of FIG. 2.

Figure 3B:
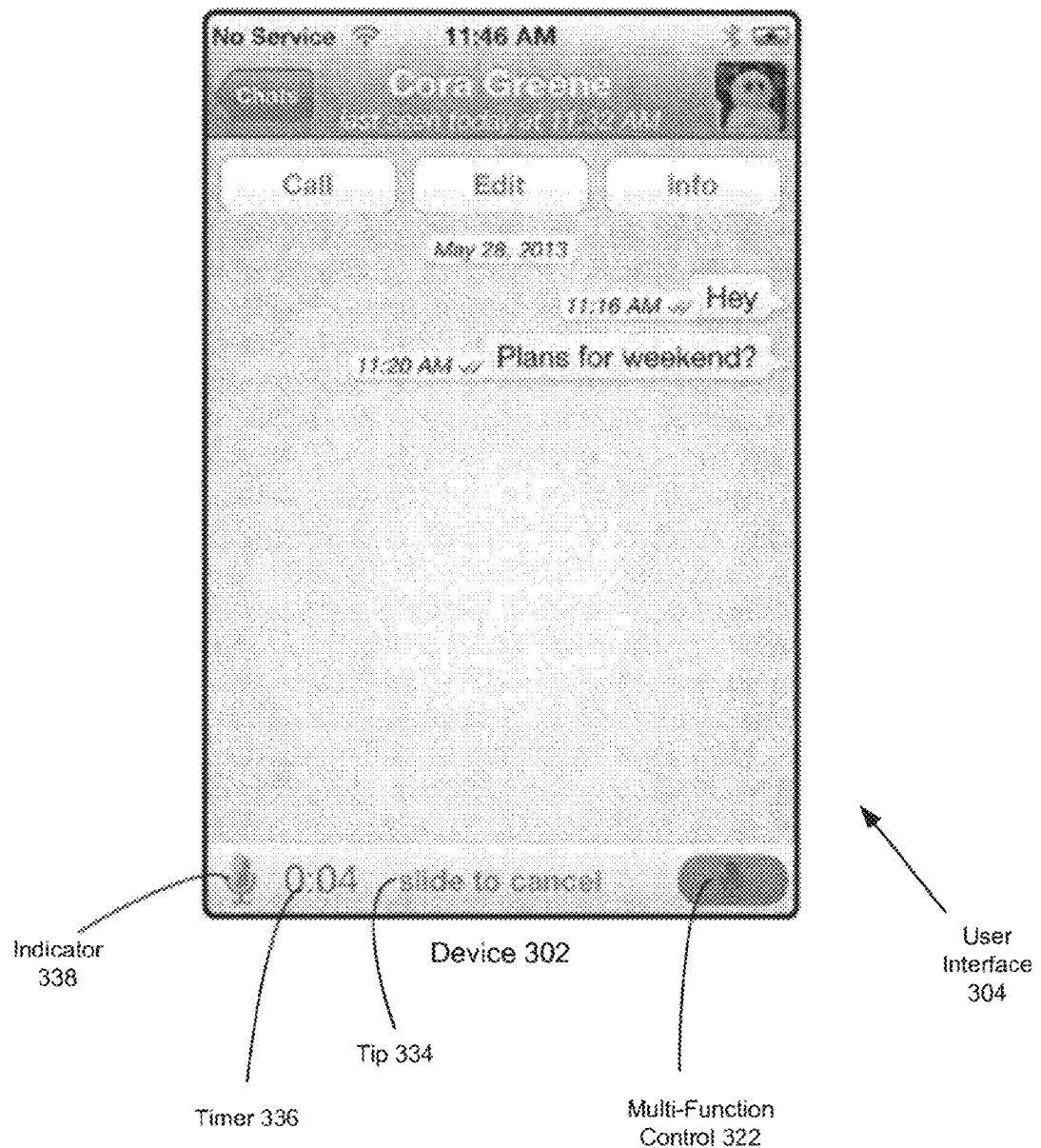

In FIG. 3B, graphical user interface 304 is displayed on the touch-screen display component of device 302 as it may appear after selection of multi-function control 322. In the illustrated implementation, selection of the control includes pressing on it (e.g., with a finger, a stylus or some other object) and holding. Upon selection of control 322, footer 320 of the GUI changes to include tip 334, timer 336 and indicator 338.

As described above, selection of the multi-function control when it is presented with the appearance shown in FIG. 3A automatically engages microphone and audio recorder components of device 302. Initiation of recording may lag slightly (e.g., half a second, one second) in case of accidental or mistaken selection of control 322, to allow rapid abandonment of the recording process without sending anything to communication partner(s) 306.

Tip 334 serves to remind the user that he can cancel the recording by sliding horizontally across the footer with the object that is pressing control 322. Timer 336 informs the user of the length of the recording so far, and indicator 338 provides a visual clue that recording is in progress. Indicator 338 may be colored (e.g., red), may flash or otherwise animate—to indicate recording is ongoing, to indicate a relative strength of the audio being captured by the device's microphone, etc. In some implementations, multi-function control 322 takes on a slightly altered appearance when pressed, such as becoming darker (or lighter) in hue.

Figure 3C:
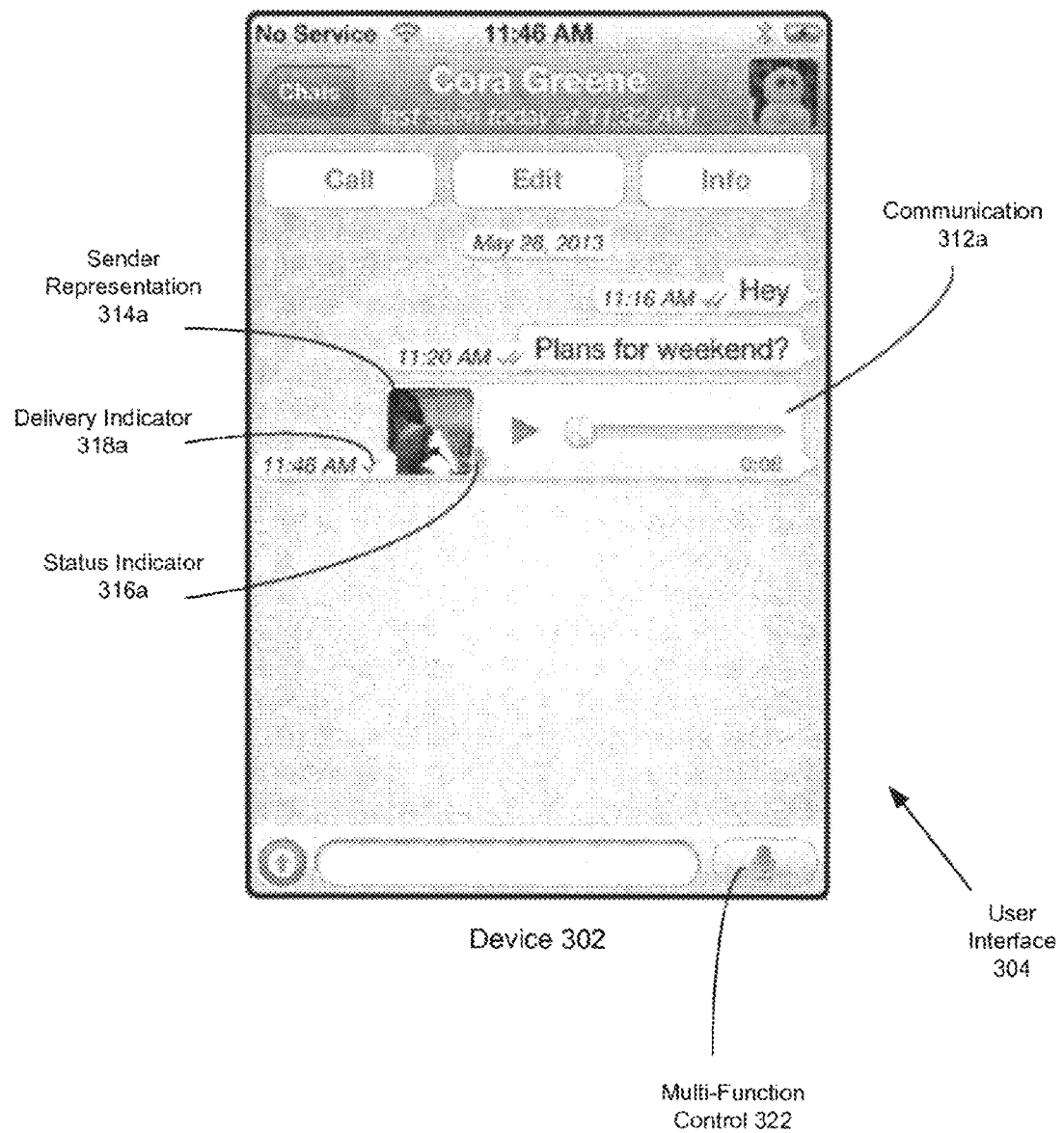

FIG. 3C depicts GUI 304 of FIG. 3B after the operator of device 302 releases multi-function control 322 and the interface returns to a state similar to that depicted in FIG. 3A. Communication 312a has been added to conversation area 310 to represent the audio recording. In addition, when the operator de-selected multi-function control 322 (e.g., by releasing it), the recording was closed and the audio recording file was uploaded to the communication system that hosts/supports the communication application associated with graphical user interface 304, for delivery to the recipient(s).

Communication 312a may include various controls related to the audio recording, such as a control for playing (and, alternately, pausing) the recording, a time field identifying a duration of the recording, a slider for rapidly accessing a desired portion of the recording (during manipulation of this control the time field may indicate a current time position within the recording) and/or others.

Also, however, communication 312a is accompanied by thumbnail or representation 314a of the creator of the recording. In a one-on-one chat or communication session such as that depicted in FIG. 3C, each communicant will usually know that a recording that appears in conversation region 310 and that he or she did not create must have been created by the other communicant. However, in a group communication session, sender representation 314a may allow a group member to easily determine who originated the associated recording. In addition, representation 314a may change over time based on a status of the recording (e.g., in addition to or instead of changes to the status indicator described immediately below).

Communication 312a is also accompanied by status indicator 316a and delivery indicator 318a. Delivery indicator 318a indicates when communication 312a has been delivered to the other member(s) of the communication session. Illustratively, a single check mark (or other symbol) indicates that the communication has been dispatched from device 302 to the communication system. A pair of check marks (or other symbol) will indicate that the communication has been delivered to the other party's device, as shown for the previous communications 312.

Status indicator 316a, however, will allow the operator of device 302 to quickly determine whether the recipient has played the recording. When the recipient initiates playback of the recording, the recipient's device will notify the system and the system will notify device 302, which will change or replace indicator 316a. In some implementations, indicator 316a changes color (e.g., from grey to blue); in other implementations, it changes in size or shape (e.g., to become a speaker instead of a microphone). In some other implementations it disappears. In yet other implementations status indicator 316a may change in other or multiple ways, sender representation 314a may change and/or other alteration(s) may be made to communication 312a to signify that the recording was played by the recipient.

In a group communication session, status indicator 316a may change in appearance any number of times as group members play the recording (e.g., to indicate a number or percentage of recipients that have played it), separate status indicators may be used for different members, the operator may select the indicator to see a list of group members that have (or have not) played the recording, etc.

Updates to status indicator 316a (and/or other indicators and statuses described herein) may or may not be reliable. In other words, even if device 302 is offline or turned off when the recipient of the audio recording associated with communication 312a plays the recording, notification of that action may be buffered at the communication system and delivered to device 302 so that the indicator can be updated when device 302 is again online.

Figure 3D:
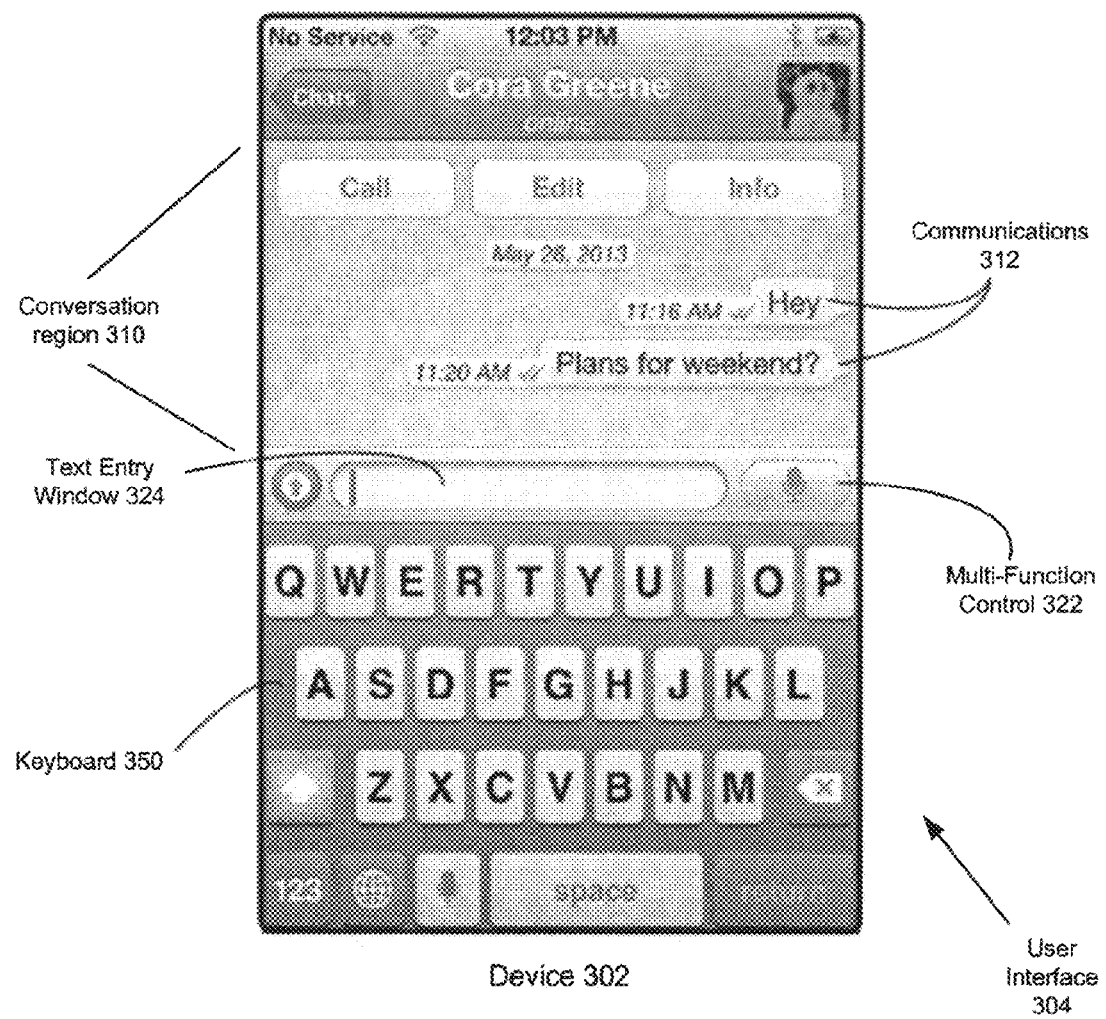

FIG. 3D depicts GUI 304 of FIG. 3A when the operator or user of device 302 selects text entry window 324 in order to compose a textual message. Conversation region 310 shrinks to accommodate appearance of keyboard 350 for use in typing the message, and a cursor is placed in the text entry window. Multi-function control 322 retains its initial or first appearance, and can be used as described above to create and send an audio recording instead of, or in addition to, sending a textual message.

Figure 3E:
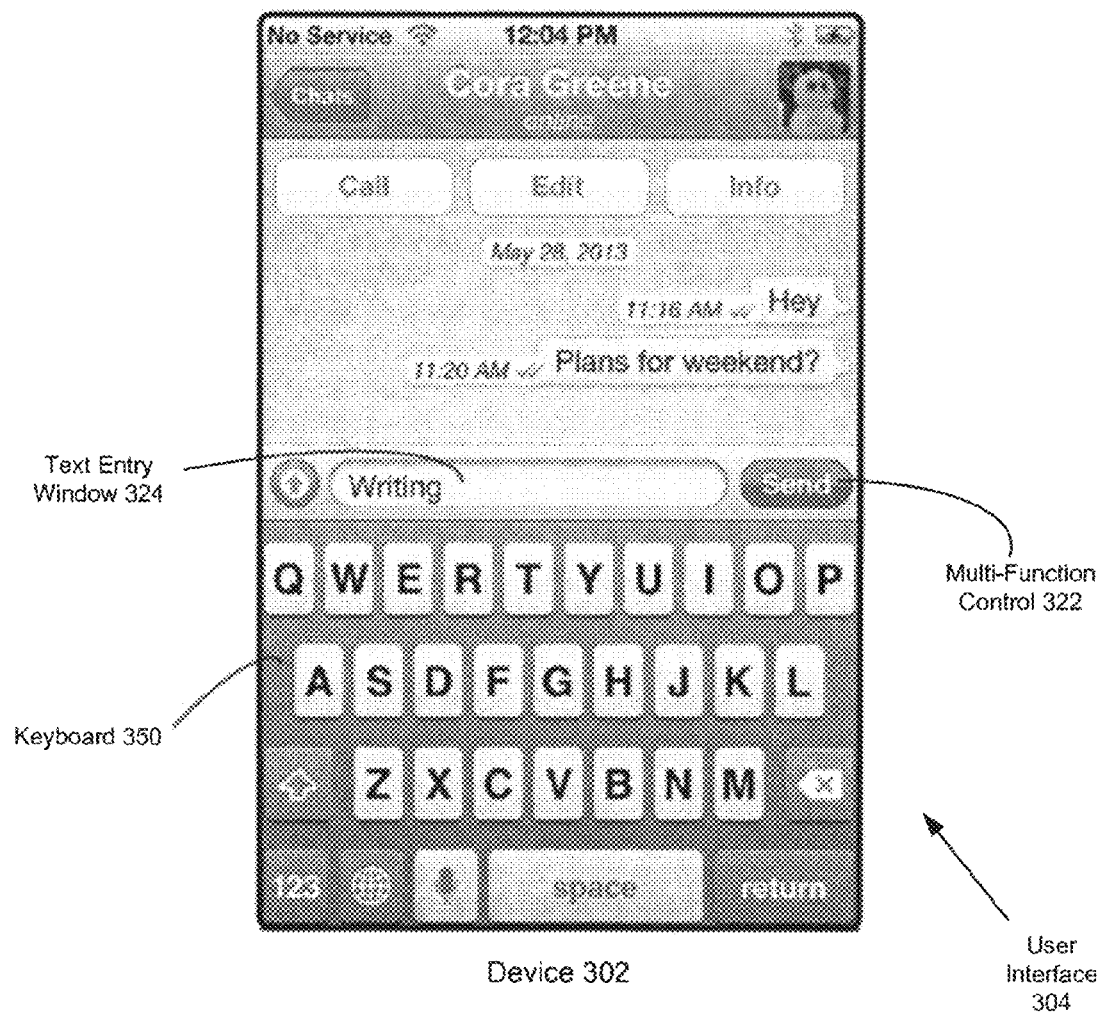

FIG. 3E depicts GUI 304 of FIG. 3D when the operator of device 302 presses one or more keys on keyboard or keypad 350. In addition to displaying in text entry window 324 the text corresponding to the user's input, multi-function control 322 changes to a second form or appearance to indicate that it can now be used to send a textual message containing the text within window 324.

In different embodiments of the invention, multi-function control 322 may take virtually any forms or appearances (e.g., a symbol or symbols in place of the word "Send"), and/or may offer different functionality, depending on the context in which it is displayed. In the illustrated example, a first context is characterized by the absence of text entered by an operator of the device, while a second context is characterized by the presence of such text.

In some embodiments, however, even after a user has entered text into text entry window 324, control 322 may still be usable to create an audio recording, and may or may not change in appearance. In these embodiments, briefly selecting control 322 (e.g., pressing and releasing it) may cause the text in the text entry window to be sent as a textual message, after which user interface may return to a state such as that illustrated in FIG. 3A or 3D (with the new textual message displayed in region 310).

However, in these embodiments, a longer selection of control 322 (e.g., pressing and holding it) will cause recording to begin after a predetermined period of time (e.g., one second, two seconds). Releasing the control will cause the recording to be forwarded toward the recipient, as described above, and may also cause the text in the text entry window to be sent as a textual message. Alternatively, after the recording is sent, the interface may return to the state it was in prior to generation of the audio recording (e.g., as illustrated in FIG. 3E) so that the user may complete his text entry, except that a new communication will appear in region 310 for the audio recording. During creation of the recording in these embodiments, the user may still be able to cancel the recording, such as by sliding horizontally, vertically or in some other direction from control 322 while control 322 is selected.

Returning to discussion of embodiments of the invention depicted in FIG. 3E, if the user activates control 322 after composing a textual message in window 324, that message will be sent and will be displayed (or a representation of the message will be displayed) in conversation region 310. Keyboard 350 may close or may remain open to allow generation of additional text.

Figure 3F:
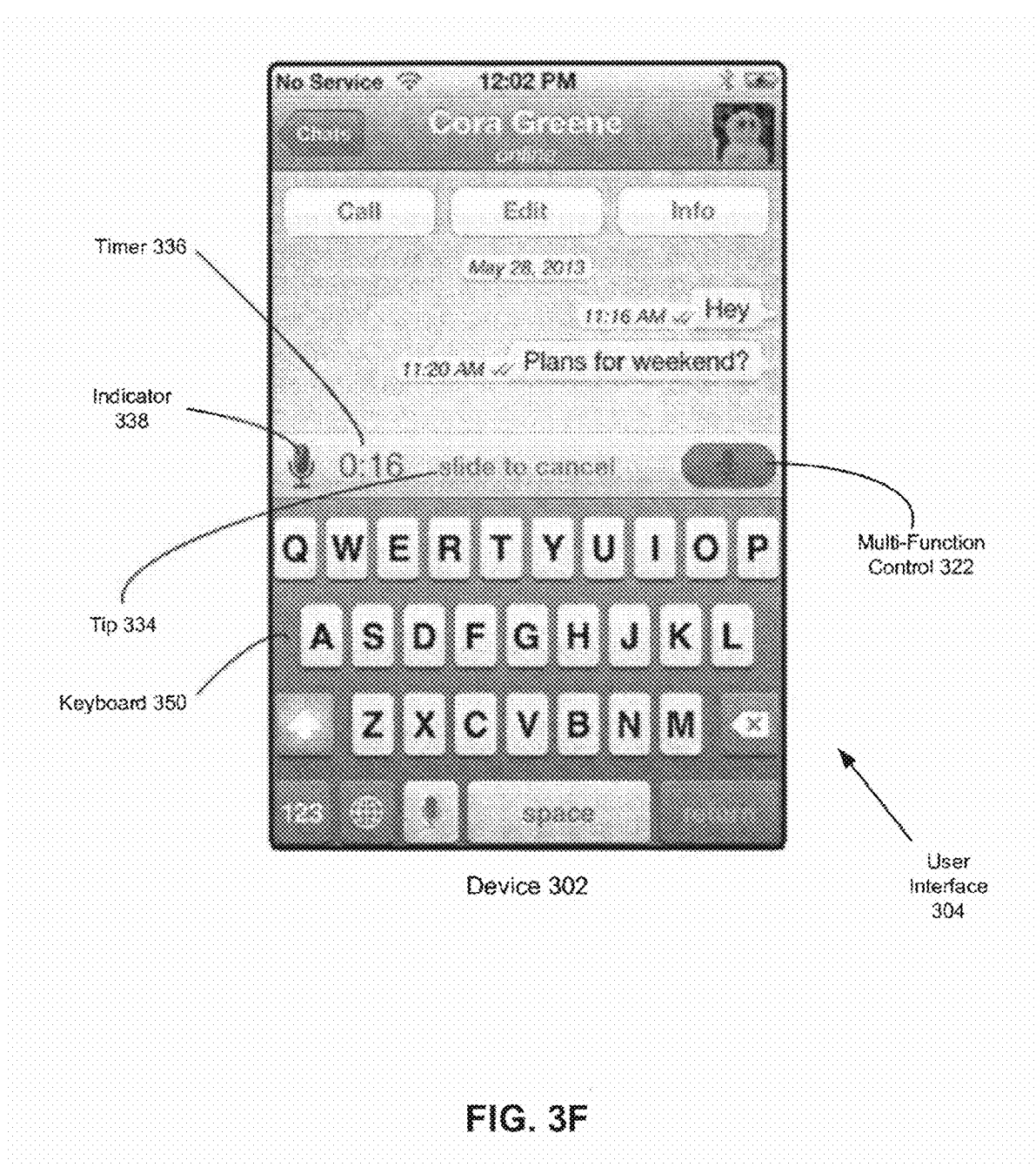

FIG. 3F depicts GUI 304 of FIG. 3D when the operator of device 302 activates multi-function control 322 without pressing or before pressing a key on keyboard 350. As described in conjunction with FIG. 3D, audio recording commences but can be cancelled as advised by tip 334.

Figure 3G:
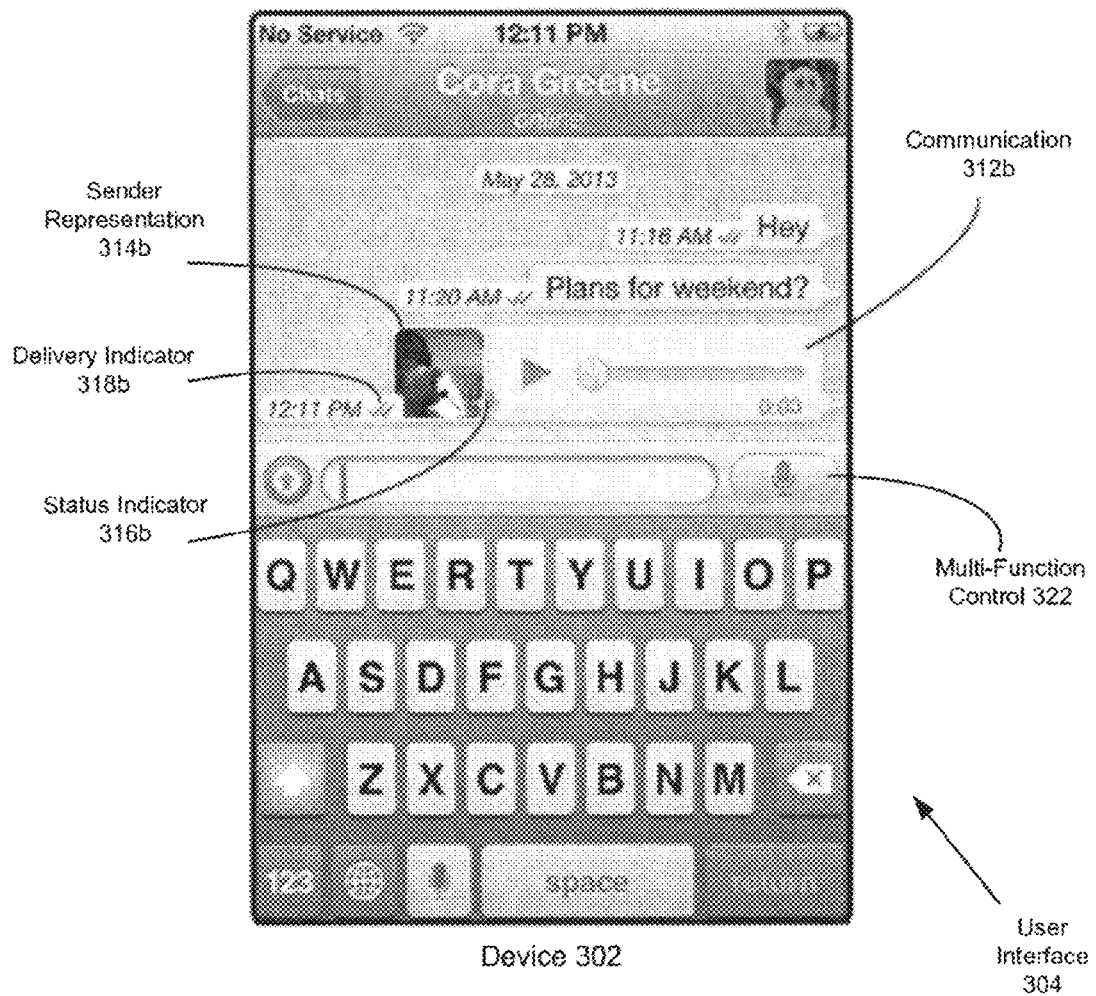

FIG. 3G depicts GUI 304 of FIG. 3F after control 322 is de-selected and the new audio recording is forwarded toward the recipient(s). New communication 312b is added to conversation region 310, and is accompanied by or includes sender representation 314b, status indicator 316b and delivery indicator 318b, which serve similar purposes to those discussed above in conjunction with FIG. 3C. In this case, the double check-marks of indicator 318b may indicate that the audio recording has been delivered to the recipient's device.

Figure 3H:
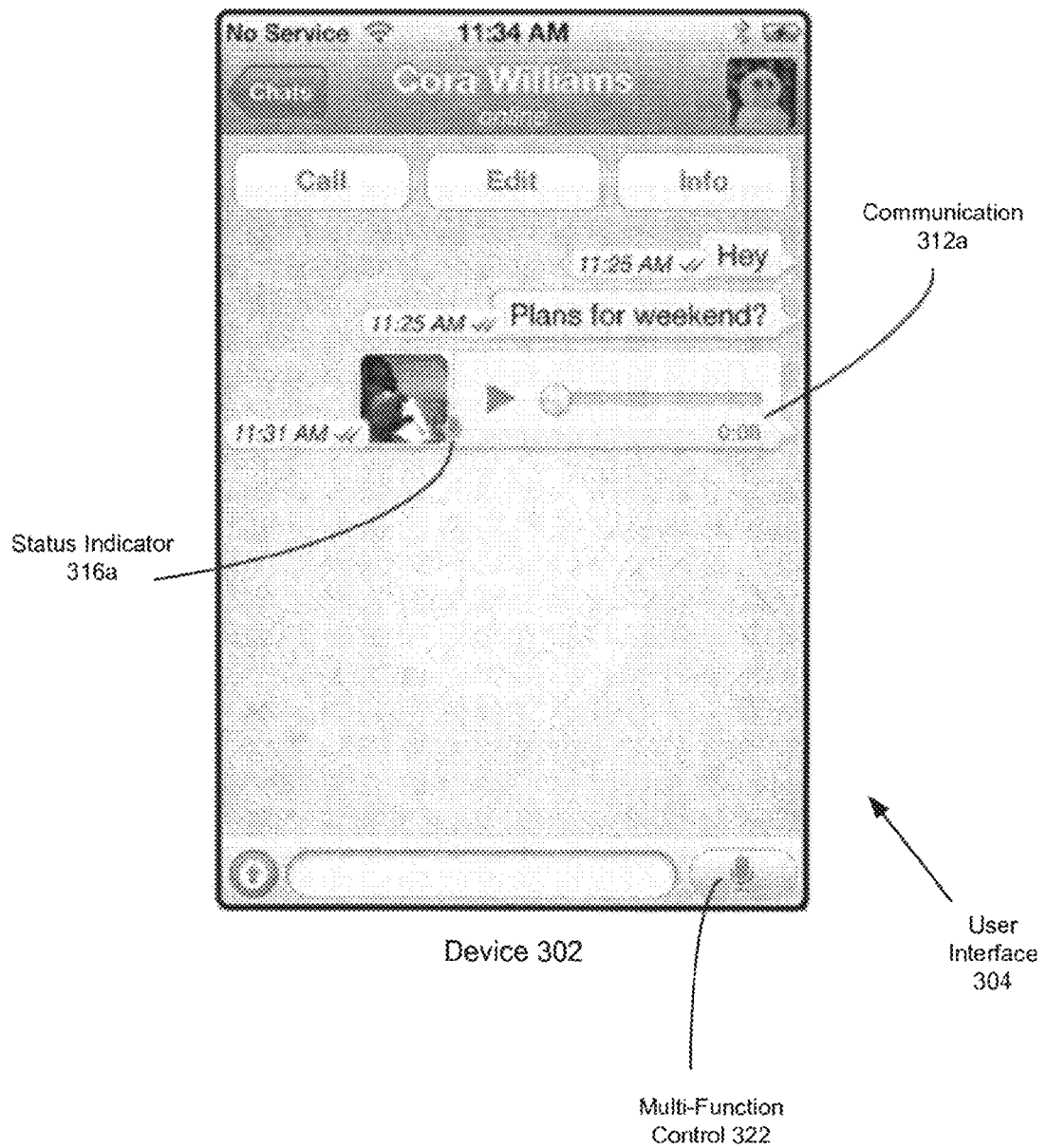

FIG. 3H depicts GUI 304 of FIG. 3C (or FIG. 3G) after the recipient commences playback of communication 312a (or communication 312b) and a real-time notification of that action is transmitted to device 302. In these embodiments of the invention, status indicator 316a changes color to alert the operator of device 302 that his recording was played or is being played. The change in color (e.g., from grey to blue) may not be evident in FIG. 3H due to the black-and-white nature of the figures, but will be notable in the color display of device 302. Alternatively, some other characteristic of status indicator 316a may change (e.g., size, shape, fill).

FIGS. 4A-D illustrate a graphical user interface for conducting voice communications with real-time status notifications, according to some embodiments of the invention. In these embodiments, device 402 is a smart phone or portable computing device operated by the other participant in the communication session reflected in FIGS. 3A-H—in other words, the recipient of an audio recording sent by the operator of device 302. Device 402 may be similar to device 302, in that it includes a touch-screen display and a microphone; also, it executes the same communication application. It may or may not be the same type or model of device or execute the same operating system.

Graphical user interface 404 displayed on the touch-screen display of device 402 includes multi-function control 422, text entry window 424 and emoticon tool 426, which may function as described above. Also, however, interface 404 includes status 448 of the other party to the conversation—currently "recording audio . . . " in FIG. 4A. Thus, the operator of device 302 is presently (or was very recently) recording audio to be sent toward device 402.

In the illustrated embodiments of the invention, when one member of a communication session commences an audio recording (e.g., via a multi-function control provided herein), the other party is notified of that action in real-time. Prior to the change to status 448 to show that the operator of the other device is recording audio, the status may have indicated that that operator was "online" or "last seen at <a particular time>", or "typing", etc.

Status 448 may remain displayed until a different status is known. For example, when the operator of the other device completes the recording (and it is on its way to device 402), the status may be changed accordingly. A device user may or may not be able to select a message or information to be displayed as status 448 on other user's device, or create a custom message.

Figure 4A:
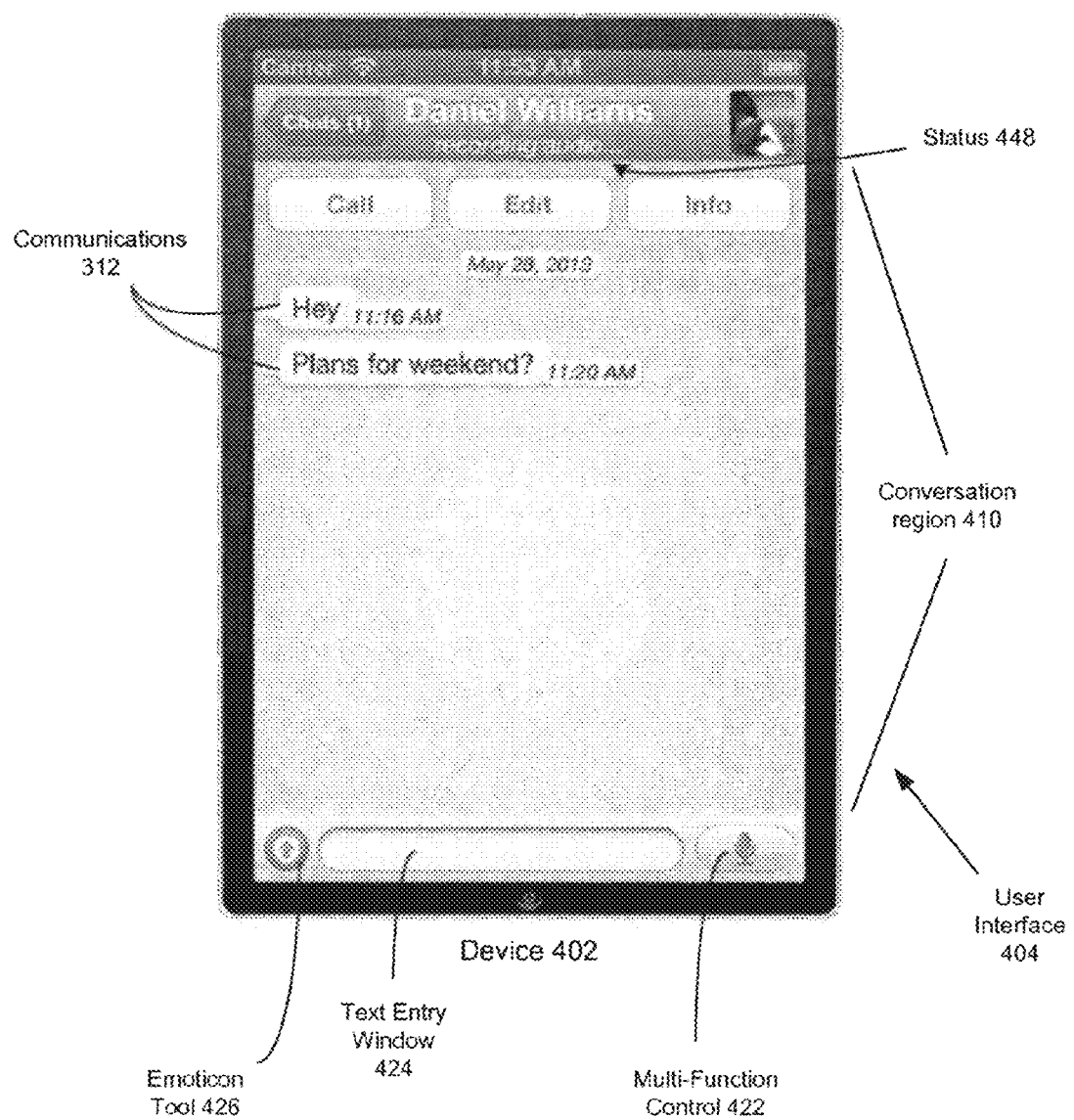
FIGS. 4A-E illustrate a graphical user interface for conducting voice communications with real-time status notifications, in accordance with some embodiments of the invention.
Figure 4B:
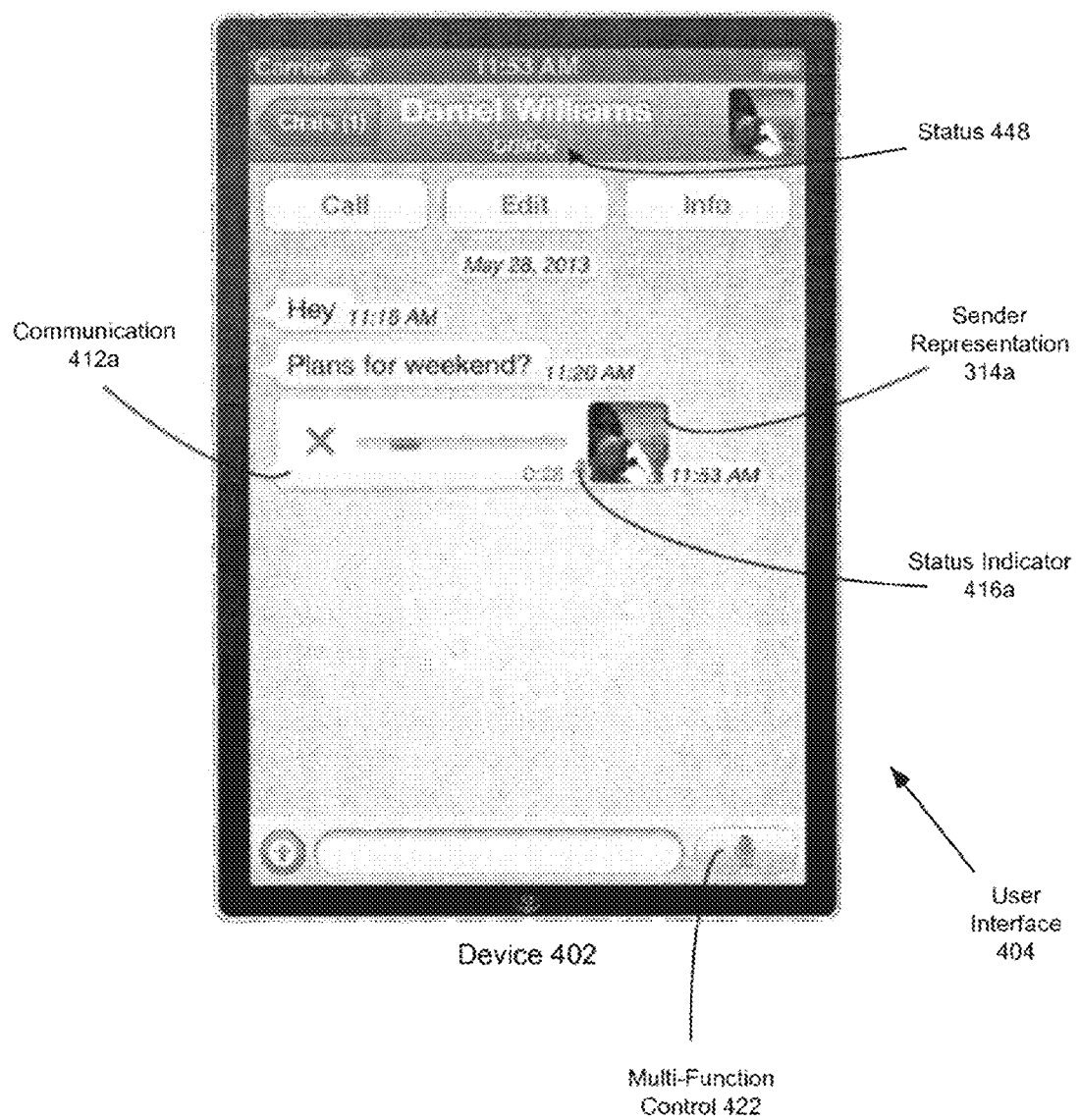

FIG. 4B depicts GUI 404 of FIG. 4A when communication 412a, an audio recording that was being recorded by a communication partner of the operator of device 402, is being downloaded. In some implementations, the recording may be downloaded automatically if/when device 402 is online. In other implementations, the operator of device 402 may be notified that the recording is available (e.g., via a link displayed in conversation region 410 identified in FIG. 4A), and must take action to download it (e.g., select the link). It may be noted that status 448 has changed to reflect the other user's current status.

Communication 412a may include symbols and/or controls for indicating a status of the download, such as a slider that reflects the progress of the download, the duration of the recording, a control for canceling the download, etc. Communication 412a also includes sender representation 314a and status indicator 416a that indicates whether the recording has been played on the receiving device.

In some implementations, a status indicator such as indicators 316a, 416a may differ in appearance between the sender and the recipient of a recording, and between different device platforms. For example, the status indicator may have different colors, different shapes, animation and so on. However it is presented, it will change in some way once the recipient begins or finishes playing the associated recording.

Figure 4C:
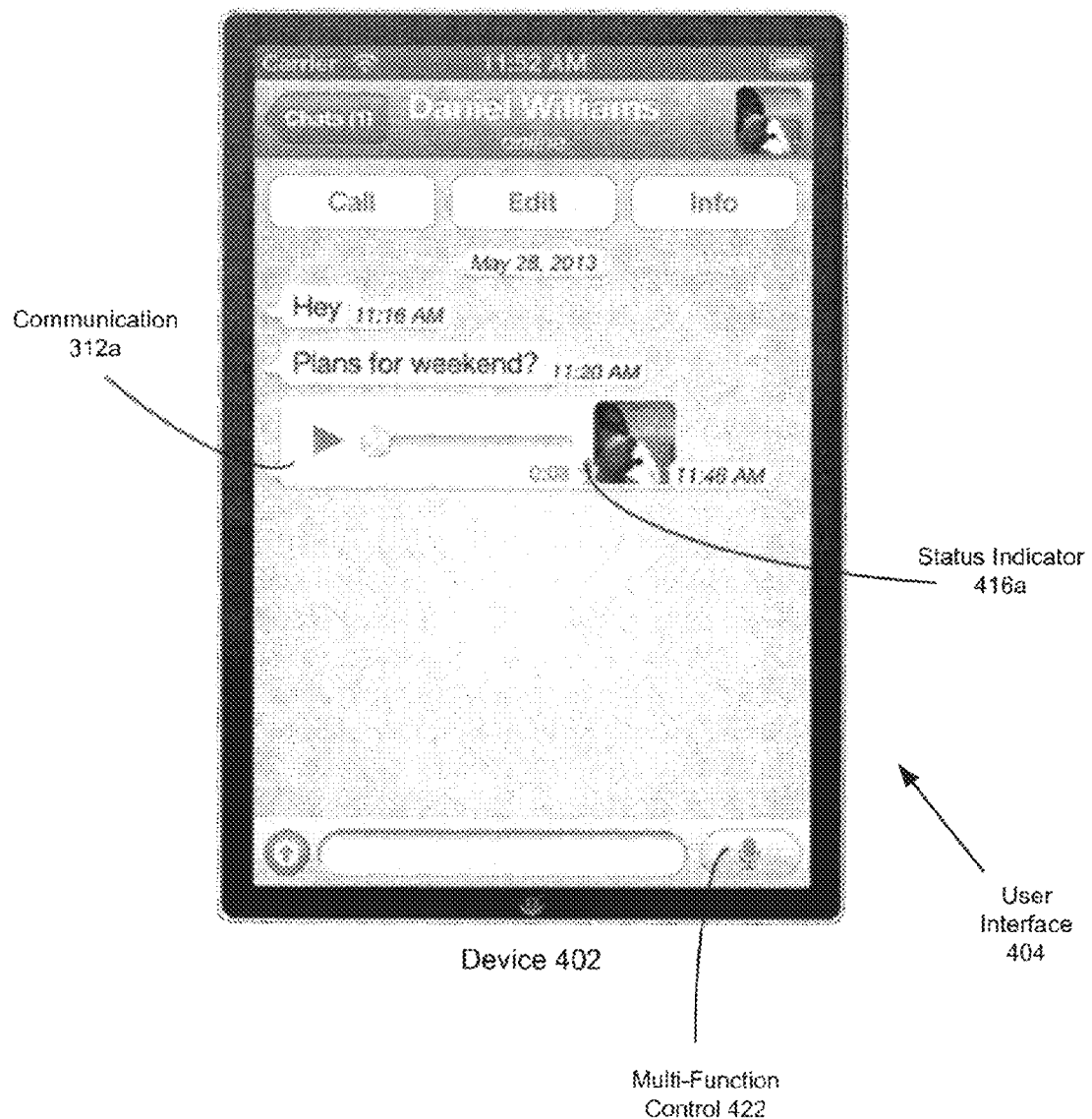

FIG. 4C depicts GUI 404 of FIG. 4B after downloading of the audio recording represented by communication 412a completes and it can be played (e.g., with a control embedded in communication 412a). Status indicator 416a has not yet changed, because the operator of device 402 has not yet played the recording.

Figure 4D:
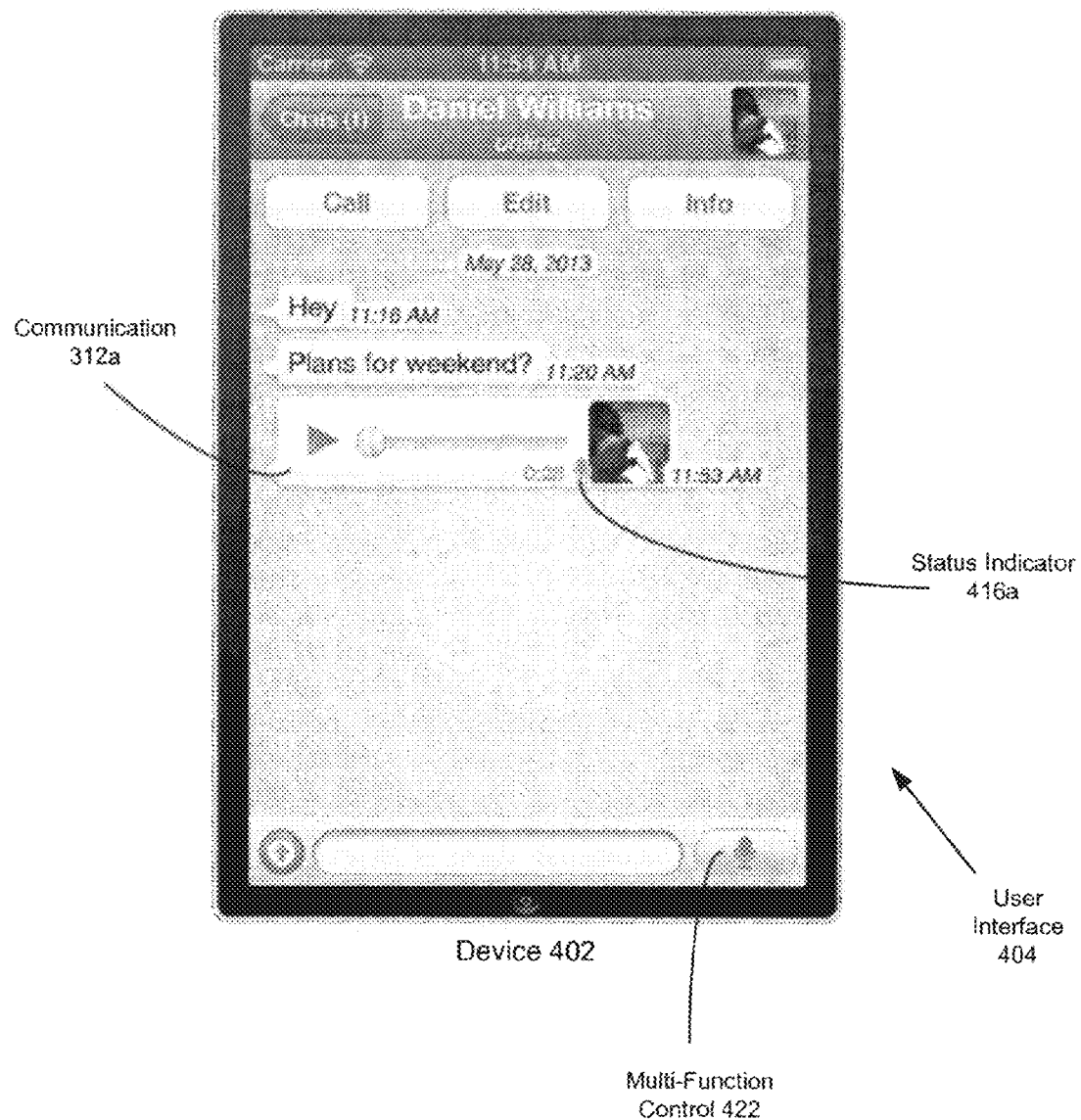

In FIG. 4D, the operator of device 402 has played (or at least commenced playing) the audio recording. Therefore, status indicator 416a has changed in appearance—in this case by changing color. In other implementations, indicator 416a may undergo a more notable change, as discussed previously. The color change (from green to blue) reflected in FIG. 4D may not be apparent due to the black-and-white nature of the figure.

Figure 4E:
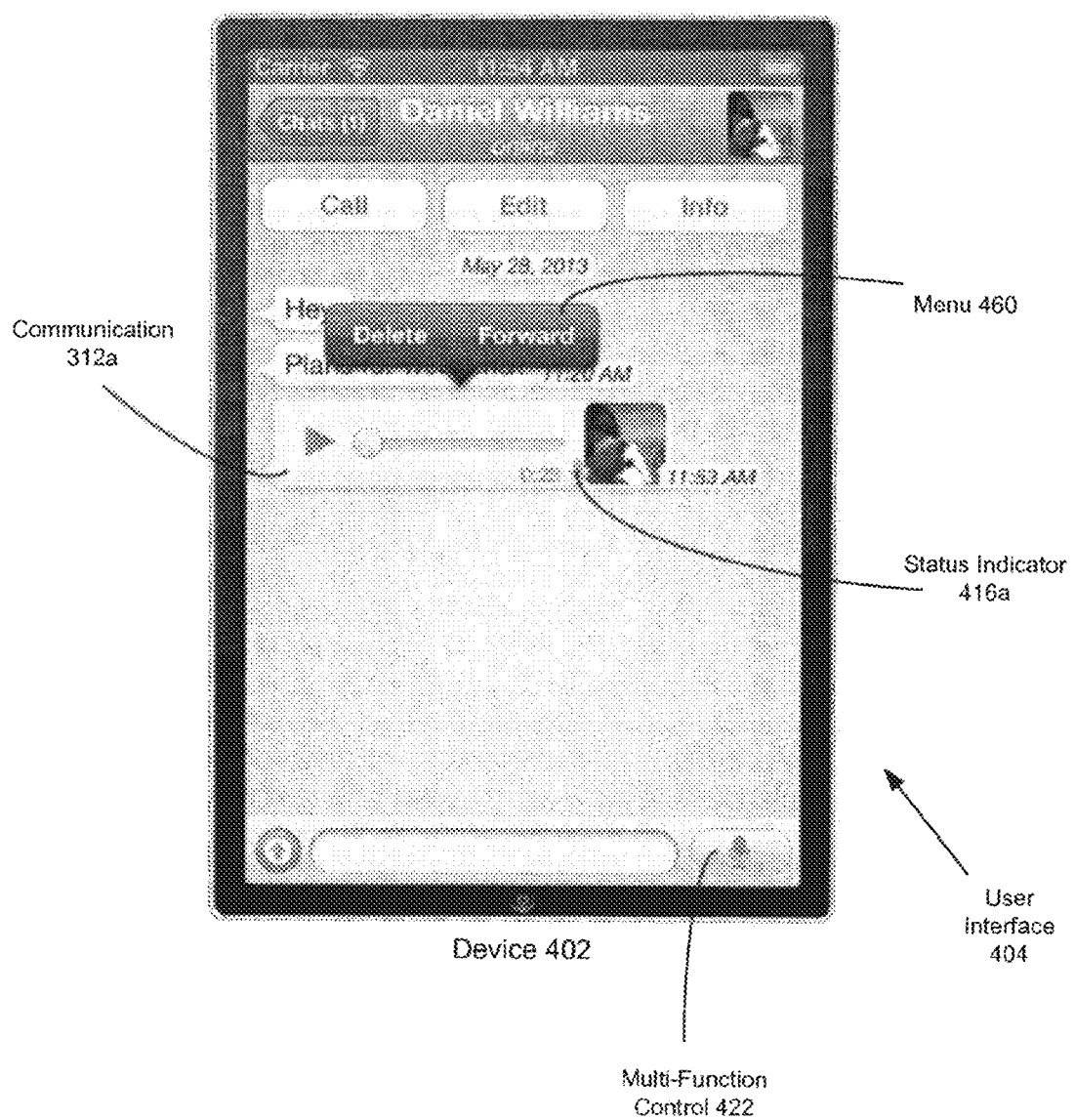

FIG. 4E depicts GUI 404 of FIG. 4D when the user of device 402 selects (e.g., presses and holds) communication 412a. When this action is detected, menu 460 is displayed on the touch-screen display to allow the user to take some action regarding the communication (and the associated recording). For example, as shown in FIG. 4E, options to delete or forward the recording may be offered. If the user wishes to respond to communication 412a with her own recording, she may activate multi-function control 422 as described above, and her recording will be automatically created and sent with just the one touch on control 422.

FIG. 5 is a flow chart demonstrating a method of supporting voice communications with real-time status notifications, according to some embodiments of the invention. In the illustrated method, a user of device 102 is engaged in a chat session with one other person—a user of device 104. The illustrated method may be modified to support voice communications within a group communication session without exceeding the scope of the invention.

In operation 500, the user of device 102 opens the communication application on his device and opens (or creates) a conversation with the user of device 104. He presses a multi-function control to initiate a voice or other audio recording (e.g., control 322 of FIG. 3A). Note that he may also enter some text into a text entry window in association with the audio recording, which may be delivered before the audio recording (e.g., if entered before commencing the recording), during (e.g., sent with the recording) or afterward (e.g., if entered after completing the recording).

Upon initiation of the recording, the communication application executing on device 102 issues an ephemeral signal to communication system 120. This signal is different from a normal chat message sent by the application as part of a communication session, in that it is not delivered to device 104 as a message. Instead, it is meant to be consumed by the application logic as described herein.

In operation 502, the communication system receives the real-time status notification regarding commencement of a recording, and relays that notification to device 104. In some implementations, the notification may be retained on system 120 only long enough to relay it to device 104 (or until acknowledgement of it is received from device 104), and then it may be discarded. In other implementations, the status may be retained until it is replaced with a new status of device 102. In embodiments of the invention reflected in FIG. 5, even if the user of device 102 has active or open communication threads or sessions with other users, only the user involved in the current conversation (i.e., the conversation for which the audio recording was initiated) is informed of the commencement of the recording.

In operation 504, device 104 receives the notification of the audio recording at device 102 and updates a display of the associated conversation to indicate the status. Illustratively, the view of the conversation at device 104 may be altered to show "recording audio" or "recording" or some other indication of the action being taken at device 102.

If the conversation is not currently being displayed on device 104, but the communication application is running, the status notification may or may not be shown. For example, if device 104 is currently displaying thumbnails of multiple conversations (e.g., as shown in FIG. 2), the thumbnail (or an icon or other portion of the thumbnail) of the conversation may blink, change color or otherwise take on an altered appearance to indicate audio activity associated with that conversation. Or, if device 104 is currently displaying another conversation, a header or other portion of that conversation may briefly change to identify the user of device 102 and indicate that he is recording audio (e.g., with a printed notification, with a tone, with an icon). For example, a ticker display may scroll across the header, a portion of it may briefly change to display the other conversation's status, the other user's thumbnail may be displayed with an audible alert, etc. If, however, the user of device 104 is currently recording or playing back audio from another conversation, no audible alert may be sounded, or there may be no indication at all of the status of device 102.

If the communication application is not currently executing on device 104, the notification may be discarded. If the application is running in the background, the notification may be consumed, but the user of device 104 will only see it if she brings the application to the foreground.

In operation 510, the user of device 102 records his audio (e.g., voice, music, a sound effect) and releases the multi-function control. Upon release of the control, device 102 (i.e., the communication application) issues a new ephemeral signal to system 120 to report the change in status.

In operation 512, communication system 120 receives the notification and processes it similar to the notification of operation 502, and relays it to device 104.

In operation 514, device 104 receives the notification and updates its display if possible (e.g., if the application is operating in the foreground on the device) to reflect the new status. Illustratively, if the user is currently viewing the conversation with the user of device 102, she may see a status indicator (e.g., in the header of the display) change to "online" or "idle" or "writing" or something else.

In operation 520, device 102 uploads the audio recording to communication system 120 (e.g., to a media server). The device may also send any text that the user of device 102 entered before and/or after making the recording. The recording may be transcoded, compressed and/or otherwise processed before or after it is uploaded.

In operation 522, system 120 stores the recording, reports it or offers it to device 104, and delivers any text that may have accompanied the recording. In some implementations, the system may attempt to immediately deliver the recording if device 104 is online. In other implementations, the system may deliver a message that appears in the conversation displayed on device 104, which may include any text associated with the recording, and that enables the user of device 104 to initiate a download of the recording. When the recording is downloaded to device 104, a control for initiating its playback is inserted into the conversation. Thus, the user of device 104 can commence playback by pressing one icon or control.

In operation 530, the user commences playback of the recording on device 104. The communication application therefore sends an ephemeral signal to system 120 to report this change in status.

In operation 532, the system receives the notification, processes it similar to the notifications from device 102, and relays it to device 102.

In operation 534, device 102 receives the notification and updates a status of the users' conversation if possible (e.g., if the application is executing in the foreground on device 102). For example, a portion of an identifier or thumbnail representing the user of device 104 (e.g., an icon) may change color, may change to a different shape, a check-mark or other symbol may be displayed, etc.

In optional operation 540, the user of device 104 moves device closer to her or further away from her during playback of the recording, and the playback proceeds through different output components. For example, while the device is relatively far from her a first speaker may be used—such as a speaker that is activated when the device is placed in a speakerphone mode of operation. When the device is placed close to the user (e.g., as if she were making a call with it), audio output may automatically switch to a speaker used when she is making a call and is not in speakerphone mode.

In optional operation 550, the user of device 102 creates a text message to the user of device 104, such as a follow-up message to the audio recording, and sends it using the same multi-function tool that was activated to create and send the audio recording. Thus, in some embodiments of the invention, a single context-sensitive control is used to send both text and recorded audio within a communication session.

Figure 6:
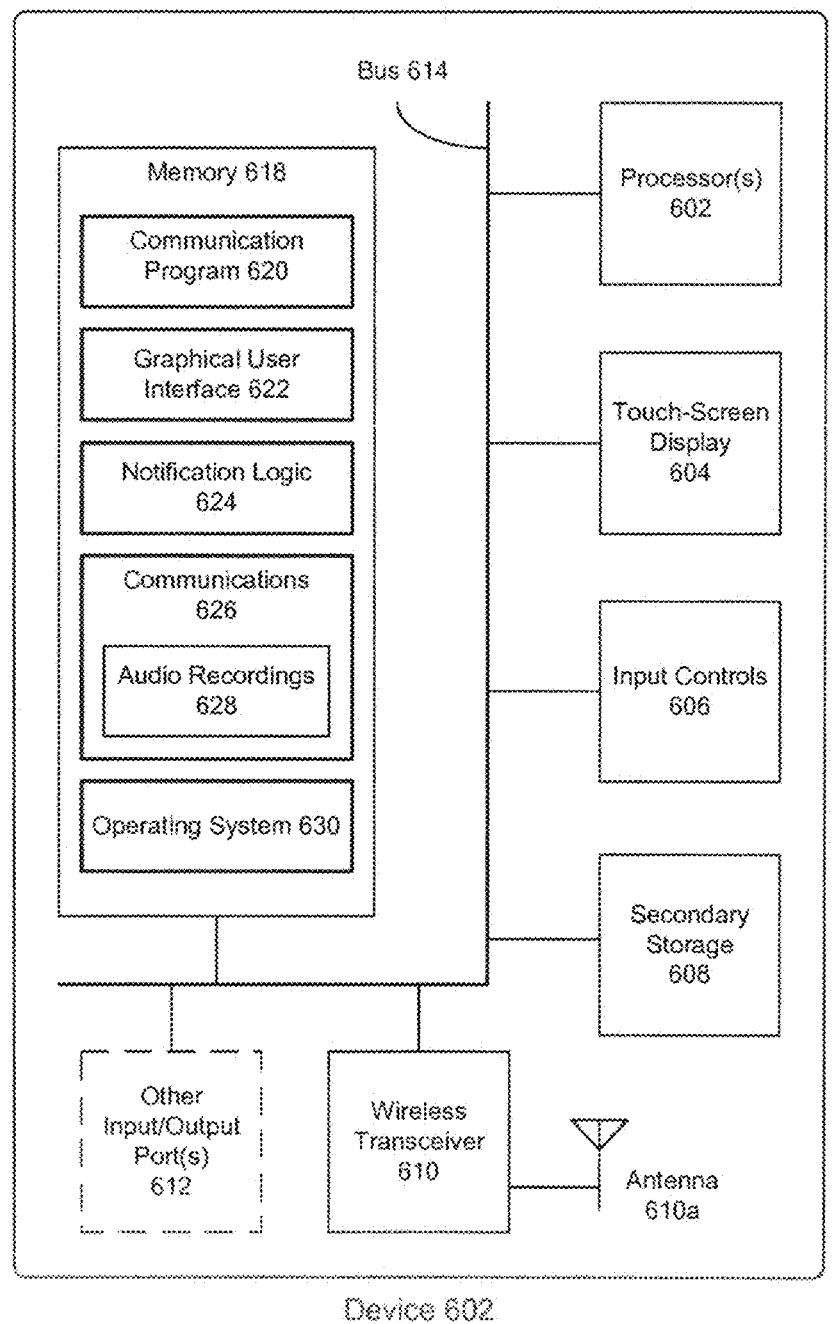
FIG. 6 is a block diagram of a portable device for conducting recorded audio communications with real-time status notifications, in accordance with some embodiments of the invention.

FIG. 6 is a block diagram of a portable device for conducting recorded audio communications with real-time status notifications, according to some embodiments of the invention.

Device 602 comprises one or more processing units or processors 602, touch-screen display 604, soft and/or hard input controls 606 (e.g., keypad, keyboard, mouse, trackball), secondary storage 608, wireless transceiver 610 (coupled to antenna 610a), optional additional input/output ports 612 and memory 618, all coupled via bus 614. Wireless transceiver 610 may have a persistent communication connection to a wireless communication service provider (e.g., a wireless telephone company's network).

Memory 618 stores programs and/or other instructions for execution by processor(s) 602. These programs include operating system 630 for managing basic device services and performing hardware-dependent functions and tasks.

Memory 618 also stores multiple program modules or sets of processor-executable instructions that support and/or implement methods of exchanging voice communications with real-time notifications. In particular, memory 618 includes communication program 620 for conducting real-time communications via text and/or media. Program 620 may be provided by the operator of a communication system such as system 120 of FIG. 1.

As part of communication application 620, or in addition to the application, memory 618 stores graphical user interface 622, notification logic 624, communications 626 (which include audio recordings 628), etc.

GUI 622 displays and manages various contents on touch-screen display 604, including a multi-function control for initiating one or both of a recorded audio message and a textual message, and which may change appearance in different contexts to signal its functionality. GUI 622 further includes a communication status indicator that changes appearance when an associated audio recording is played, and which may further change appearance for other reasons (e.g., a recipient forwards the audio recording or deletes it). Yet further, GUI 622 includes a status of a communication partner (e.g., to indicate when that partner is recording audio), representations of communications to display in a conversation region of display 604, thumbnail images of communication partners, and so on.

Notification logic 624, when executed by processor(s) 602 issues and/or consumes real-time notifications. For example, logic 624 may issue a notification toward another device when an operator of device 602 records audio to be sent to a user of the other device, may send another notification when recording is complete, and another when the operator of device 602 plays a recording received from the other device.

Communications 626 include at least some of the communications exchanged between the operator of device 602 and participants in the operator's communication/chat sessions. Other (e.g., older) communications may be stored in secondary storage 608 until needed (e.g., if the device operator scrolls through his communications).

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method comprising:
  receiving, at a network interface of a receiving device, a first notification indicating that audio recording is in progress at a sending device;
  displaying, on a display device, a status of the audio recording in response to receiving the first notification;
  replacing the status of the audio recording on the display device with a status of the sending device that was displayed prior to the status of the audio recording being displayed, the replacing occurring in response to a termination notification indicating that the audio recording at the first device is terminated; and receiving, at the network interface, the audio recording from the sending device after the first notification is received.

2. The method of claim 1, further comprising:

commencing playback of the audio recording; and transmitting a second notification, in response to commencing playback of the audio recording, to the sending device.

3. The method of claim 2, the second notification configured to cause the sending device to update a display to indicate that the receiving device has commenced playback of the audio recording, the second notification being transmitted from the receiving device in real-time or during playback of the audio recording at the receiving device.

4. The method of claim 1, further comprising receiving, at the receiving device from an intermediate device, a textual message comprising a link associated with the audio recording.

5. The method of claim 1, further comprising receiving, from the sending device, the termination notification transmitted upon termination of the audio recording at the first device, the termination notification configured to cause the receiving device to remove the status of the audio recording.

6. The method of claim 1, wherein the second notification is configured to cause the sending device to change a display of a status of the receiving device before playback of the audio recording at the receiving device has completed.

7. A non-transitory computer-readable medium storing:

instructions configured to cause one or more processors to receive, at a network interface of a receiving device, a first notification indicating that audio recording is in progress at a sending device;

instructions configured to cause the one or more processors to display, on a display device, a status of the audio recording in response to receiving the first notification;

instructions configured to cause the one or more processors to replace the status of the audio recording on the display device with a status of the sending device that was displayed prior to the status of the audio recording being displayed, the replacing occurring in response to a termination notification indicating that the audio recording at the first device is terminated; and instructions configured to cause the one or more processors to receive, at the network interface, the audio recording from the sending device after the first notification is received.

8. The medium of claim 7, further storing:

instructions configured to cause the one or more processors to commence playback of the audio recording; and instructions configured to cause the one or more processors to transmit a second notification, in response to commencing playback of the audio recording, to the sending device.

9. The medium of claim 8, the second notification configured to cause the sending device to update a display to indicate that the receiving device has commenced playback of the audio recording, the second notification being transmitted from the receiving device in real-time or during playback of the audio recording at the receiving device.

10. The medium of claim 7, further comprising instructions configured to cause the one or more processors to receive, at the receiving device from an intermediate device, a textual message comprising a link associated with the audio recording.

11. The medium of claim 7, further comprising instructions configured to cause the one or more processors to receive, from the sending device, the termination notification transmitted upon termination of the audio recording at the first device, the termination notification configured to cause the receiving device to remove the status of the audio recording.

12. The medium of claim 7, wherein the second notification is configured to cause the sending device to change a display of a status of the receiving device before playback of the audio recording at the receiving device has completed.

13. A receiving device comprising:

a network interface configured to receive a first notification indicating that audio recording is in progress at a sending device;

a display device configured to display a status of the audio recording in response to receiving the first notification;

status logic configured to replace the status of the audio recording on the display device with a status of the sending device that was displayed prior to the status of the audio recording being displayed, the replacing occurring in response to a termination notification indicating that the audio recording at the first device is terminated; and audio logic configured to receive the audio recording from the sending device after the first notification is received.

14. The receiving device of claim 13, the audio logic further configured to commence playback of the audio recording, and further comprising notification logic configured to transmit a second notification, in response to commencing playback of the audio recording, to the sending device.

15. The receiving device of claim 14, the second notification configured to cause the sending device to update a display to indicate that the receiving device has commenced playback of the audio recording, the second notification being transmitted from the receiving device in real-time or during playback of the audio recording at the receiving device.

16. The receiving device of claim 13, the network interface further configured to receive, from an intermediate device, a textual message comprising a link associated with the audio recording.

17. The receiving device of claim 13, the network interface further configured to receive, from the sending device, the termination notification transmitted upon termination of the audio recording at the first device, the termination notification configured to cause the receiving device to remove the status of the audio recording.

* * * * *